(No Model.)
J. HOOVER & A. W. JAY.
COW MILKER.
No. 474,830. Patented May 17, 1892.
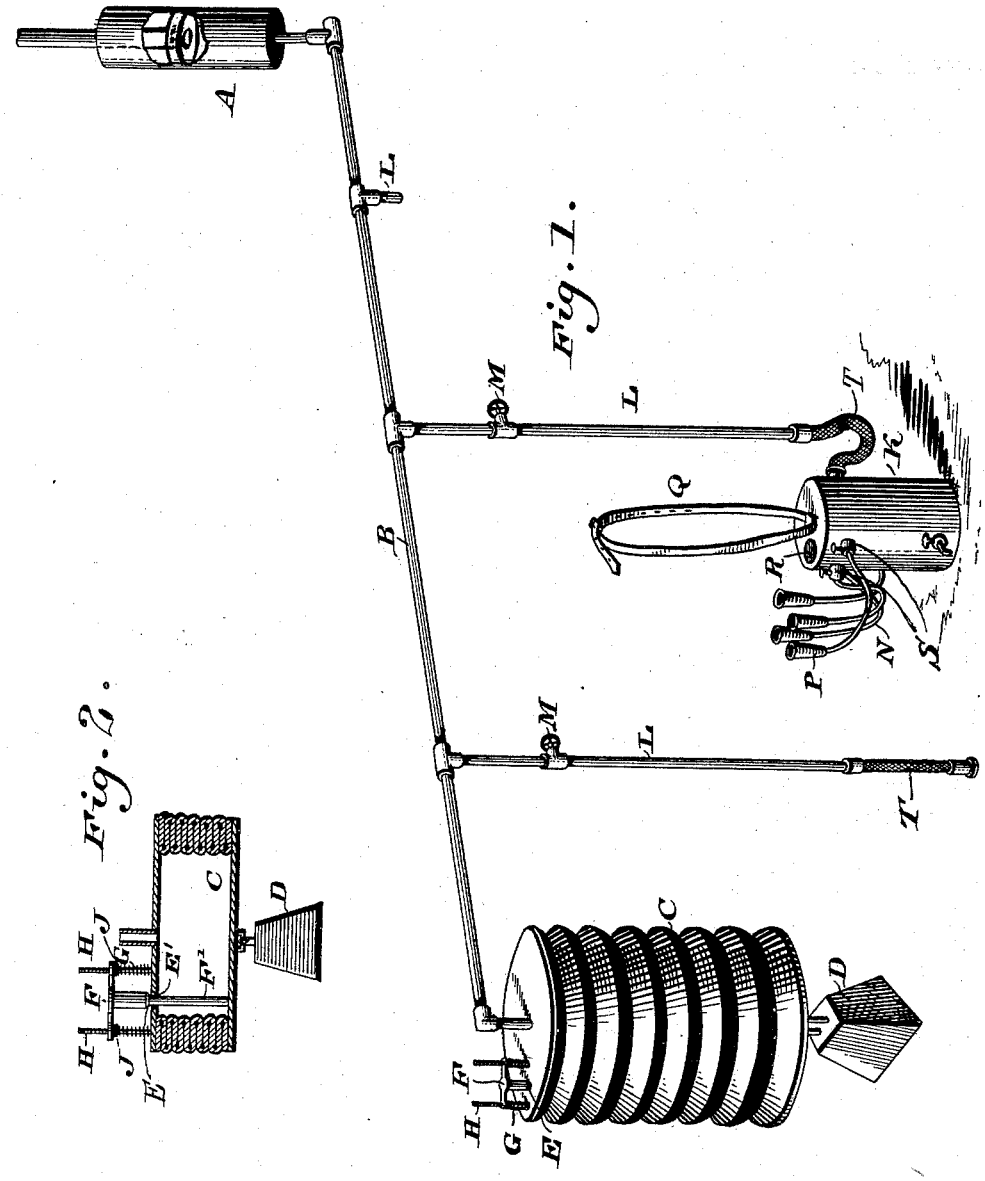
WITNESSES:
P. H. Nagle.
L. Douville.
INVENTORS:
Joseph Hoover
BY Allen W. Jay
John A. Wiederscheim
ATTORNEY.

UNITED STATES PATENT OFFICE.

JOSEPH HOOVER AND ALLEN WADE JAY, OF MINERVA, IOWA.

COW-MILKER.

SPECIFICATION forming part of Letters Patent No. 474,830, dated May 17, 1892.

Application filed September 29, 1891. Serial No. 407,144. (No model.)

*To all whom it may concern:*

Be it known that we, JOSEPH HOOVER and ALLEN WADE JAY, citizens of the United States, both residing at Minerva, in the county of Marshall, State of Iowa, have invented a new and useful Improvement in Cow-Milkers, which improvement is fully set forth in the following specification and accompanying drawings.

Our invention relates to improvements in cow-milkers; and it consists of an apparatus having a main pipe with an air-reservoir and an air-exhauster and a milk-receptacle adapted to be connected with the main pipe and the teats of the animal to be milked.

It further consists of the combination of parts hereinafter set forth and described.

Figure 1 represents a perspective view of a milking-machine embodying our invention. Fig. 2 represents a vertical section of a detail portion of the same.

Similar letters of reference indicate corresponding parts in both figures.

Referring to the drawings, A designates an air-exhaust pump provided with a pipe or tubing B, which is connected with the upper end of a collapsible air-reservoir C, forming an air-supply tank for the said pipe B during the operation of the pump A. The said reservoir has the weight D attached to its lower end for normally keeping it distended, and is provided with an opening E' in its top, the walls of which opening form a seat for a rising-and-falling valve E, which is connected at its upper end with the cross-bar F. The said valve is normally kept closed by means of the coil springs G, which encircle the bolts H and are connnected to the said bar F and the bellows, the said bolts being secured to the top of the reservoir C and having the nuts J on threaded portions thereof and in such position that the ends of the cross-bar rest thereon when the valve is closed. The valve-rod has a depending portion F', projecting into the reservoir C, for a purpose hereinafter explained.

K designates a suitable air-tight receptacle or bucket for the milk, having the tubing L, with valve M therein, for connecting it to the main pipe B, and tubing N, with the suckers or teat-cups P, for connecting it with the teats of the animal. Each of the suckers or teat-cups P is composed of any suitable elastic material, as rubber, adapted to closely embrace the teat, thereby forming an air-tight joint. The receptacle K can be placed where most convenient along the pipe B, near or under the animal to be milked, and is provided with a belt Q for securing it thereto, if so desired. The bucket or receptacle K is provided in its upper part with a glass plate R, whereby the flow of the milk into the receptacle can be seen. Any number of receptacles K with proper tubing can be connected to the main pipe B and operated, the air-reservoir C being weighted accordingly. But one receptacle K is shown in the drawings, as each one employed is similar in construction and operation; but any number may be used, as is evident. In the drawings, two pipes L and tubes T are shown, and it is manifest that a milk-receptacle K, similar to that shown in the drawings, may be attached to the tube T not having a receptacle K connected therewith. It will be seen that as the air is exhausted from the pipe B and a receptacle K a suction is produced which draws the milk from the udder of the cow connected therewith into the said receptacle, the valve M controlling said exhaust and also preventing the flow of milk into the main pipe. The bottom of the reservoir C rises during the operation of milking, owing to the exhaust of the air therein, until it comes in contact with the depending stem F' of the valve, and which passes through the opening E', and moves the same so as to raise the valve E and thereby permit the inlet of air into the reservoir when the weighted lower end of the latter descends. The tubing N is provided with a valve S, whereby when the teat to which it has been attached is dry the suction on the same may be stopped. The tubing L is connected with the receptacle K by a flexible tube T for convenience in operating the said parts.

The machine as herein described is simple in its construction, easily operated, durable in character, and readily kept in cleansed condition, which in devices for the purpose of milking is very desirable.

Having thus described our invention, what we claim as new, and desire to secure by Letters Patent, is—

1. A cow-milker consisting of an air-exhauster having a main pipe connected therewith, a milk-receptacle connected with said main pipe provided with teat-cups adapted to be connected with the teats of an animal to be milked, and an air-reservoir connected with said main pipe, said parts being combined substantially as described.

2. A cow-milker consisting of an air exhauster, a main pipe connected with said air-exhauster, a milk-receptacle connected with said main pipe and adapted to be connected with the teats of an animal to be milked, and a collapsible air-reservoir connected with said main pipe, said parts being combined substantially as described.

3. A cow-milker consisting of an air-exhauster, a main pipe connected therewith, a milk-receptacle connected with said pipe and having tubing with teat-cups, and a collapsible air-reservoir connected with said main pipe and having an air-inlet valve controlled by the movement of said reservoir, said parts being combined substantially as described.

4. In a cow-milker, a collapsible air-reservoir having a weighted lower end and provided with an opening in its upper wall, and a rising-and-falling valve seated on the walls of said opening and provided with a stem adapted to be engaged by said bottom, said parts being combined substantially as described.

JOSEPH HOOVER.
ALLEN WADE JAY.

Witnesses:
W. L. MARSH,
ROBERT DENBOW.